United States Patent [19]
Tanigawa et al.

[11] 3,779,524
[45] Dec. 18, 1973

[54] GAS-LIQUID CONTACTING APPARATUS
[75] Inventors: Shogo Tanigawa; Takesi Yokoyama, both of Tamano; Kouichi Karakawa, Toyama, all of Japan
[73] Assignee: Mitsui Shipbuilding and Engineering Co. Ltd., Chuoku, Tokyo, Japan
[22] Filed: Aug. 10, 1971
[21] Appl. No.: 170,430

[52] U.S. Cl. .......................... 261/114 R, 55/257
[51] Int. Cl. .......................................... B01d 3/26
[58] Field of Search............. 55/223, 240, 255–257; 261/114 R, 114 A, 114 UT, 114 SP, 113

[56] References Cited
UNITED STATES PATENTS

| | | |
|---|---|---|
| 410,634 | 9/1889 | Bolton.............................. 261/114 R |
| 1,608,416 | 11/1926 | Newton............................ 261/114 R |
| 1,918,005 | 7/1933 | Urquhart.......................... 261/114 R |
| 2,522,425 | 9/1950 | Baumann et al................. 261/114 A |
| 2,523,126 | 9/1950 | Long................................ 261/114 A |
| 2,525,218 | 10/1950 | Glitsch............................. 261/114 A |
| 2,819,049 | 1/1958 | Manning, Jr. et al............ 261/114 A |
| 2,862,698 | 12/1958 | Howerton et al................. 261/114 A |
| 3,633,882 | 1/1972 | Karakawa et al................ 261/114 R |

Primary Examiner—Tim R. Miles
Assistant Examiner—Steven H. Markowitz
Attorney—Howson and Howson

[57] ABSTRACT

A gas-liquid contacting apparatus provided with vertically spaced trays having gas flow aperture therein and a contacting structure provided on the trays. The contacting structure has a cover for preventing gas and liquid to ascending and partition plate therein.

3 Claims, 9 Drawing Figures

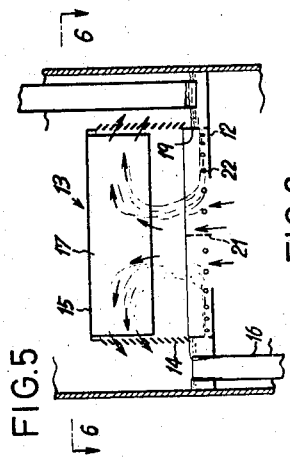
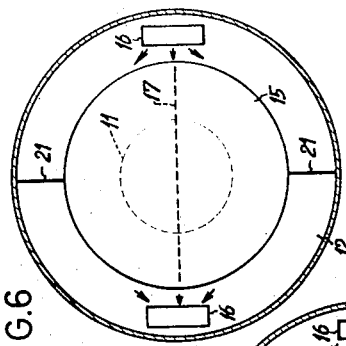
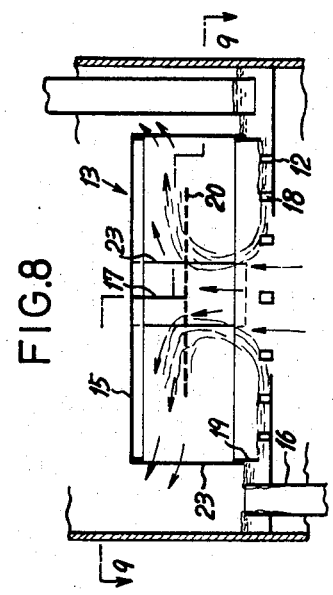
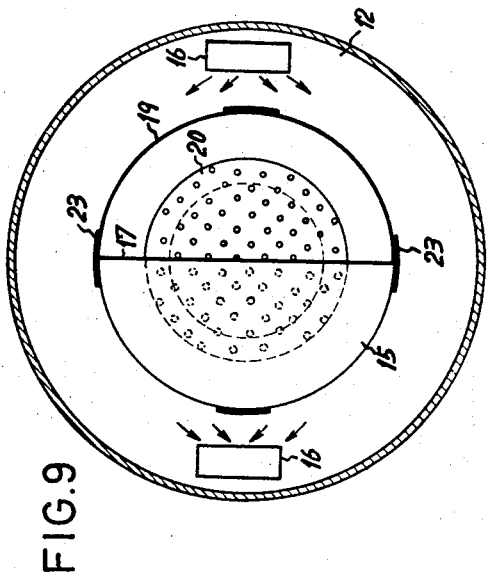

GAS-LIQUID CONTACTING APPARATUS

The present invention relates to a gas-liquid contacting apparatus for heat or mass transfer, such as distillation apparatus or absorption apparatus in the chemical industry. In the conventional gas-liquid contacting apparatus comprising sieve trays, gas and liquid contact each other only once at a contacting structure such as bubble cap provided on the tray.

An object of the present invention is to provide a gas-liquid contacting apparatus which enable gas and liquid to contact repeatedly each other at each contacting structure, and may extend a remaining time of liquid at the tray, so that contacting efficiency is increased.

To this end, the gas-liquid contacting apparatus in accordance with the present invention provides partition plates or baffles to increase contacting effect at one tray.

In the drawings,

FIG. 5 is a vertical sectional view showing further another embodiment of the present invention;

FIG. 6 is a sectional view taken on line 6—6 in FIG. 5;

FIG. 7 is a horizontal sectional view showing a still another embodiment of the present invention;

FIG. 8 is a vertical sectional view of another embodiment of the present invention; and FIG. 9 is a sectional view taken on line 9—9 FIG. 8.

Figure 1:
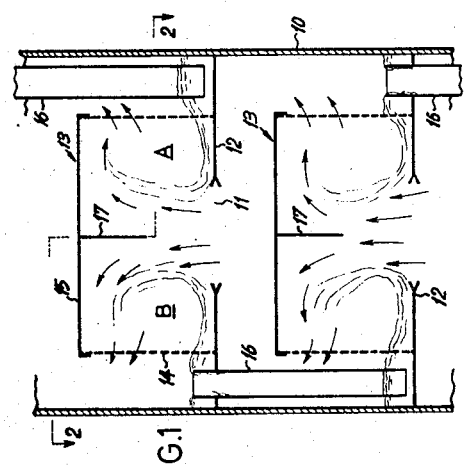
FIG. 1 is a vertical sectional view of one embodiment of the present invention.
Figure 2:
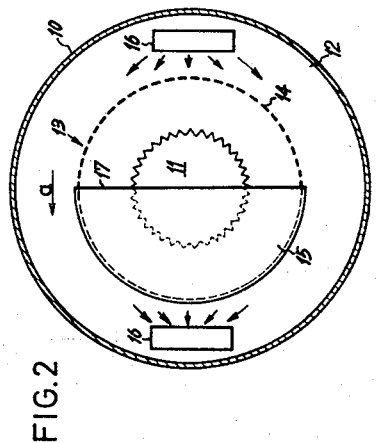
FIG. 2 is a sectional view taken on line 2—2 in FIG. 1.

Referring to the drawings, and particularly to FIGS. 1 and 2, trays 12 having an aperture 11 at a central portion thereof are provided in a column 10 at a suitable space. Each tray 12 is provided with a cylindrical gas-liquid contacting structure 13. The gas-liquid contacting structure comprising a perforated cylinder 14 and a cover 15. Each tray 12 is also provided with a downcomer 16 at the out side of the structure 13, the downcomer projecting upwardly from the tray 12 to maintain liquid thereon at a predetermined depth, and the lower end of the downcomer being near the lower tray. Each downcomer is arranged in alternately diametrically opposite position at every tray. In the gas-liquid contacting structure, a partition plate 17 is provided at a right angle with the flowing direction of liquid on the tray indicated by the arrow "a" in FIG. 2. The edge of the aperture 11 is formed in a sawteeth shape as shown in FIG. 2.

Liquid on the tray 12 overflows into the top of the downcomers 16 and flows down the inside walls thereof. The liquid is maintained on each tray 12 at a level determined by the height of the downcomer and passed by head through the apertures of the cylinder 14, and flows to the aperture 11 of the tray 12. The liquid on the tray is blown up by the gas ascending through the aperture 11 to form a gas liquid mixing flow in the contacting structure. The gas liquid mixing flow ascends in the contacting structure and turned by the cover 13, and passes through the apertures of the cylinder 14. Gas is separated from the liquid when passes through the apertures, and ascends to the upper tray. Atomized liquid is collected when passes through the apertures and grown into drops or flows, and flows down to the pool maintained on the tray 12. Thus the liquid is circulated and repeatedly contacts with gas. The partition plate 17 provided in the contacting structure 13 assures the circulation of liquid as hereinafter described.

Liquid flows out of the downcomer 16 as shown by arrows in FIG. 2, and enters into the room A formed by the partition plate 17 and flows out of the room A after contacting with gas. Then the liquid flows in the direction of the arrow "a", enters into the room B and contacts again with gas in the room B. Thereafter the liquid flows out of the room B and down through the downcomer 16. Thus liquid contacts with gas at least two times.

Figure 3:
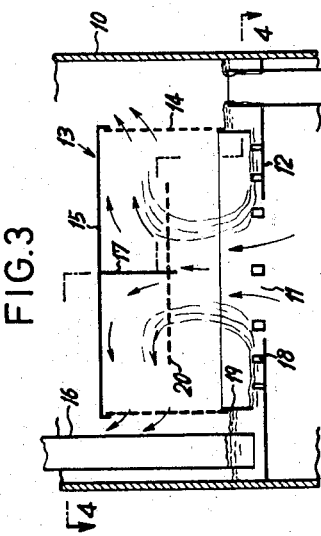
FIG. 3 is a vertical sectional view showing another embodiment of the present invention.
Figure 4:
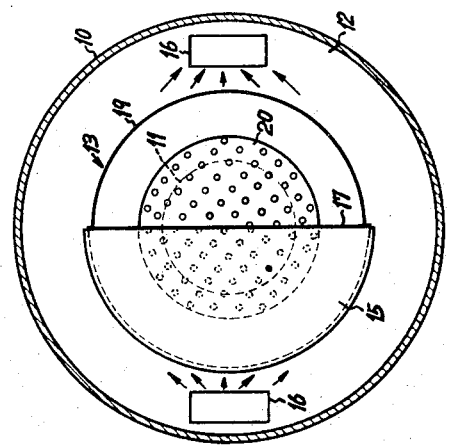
FIG. 4 is a sectional view taken on line 4—4 in FIG. 3.

In the apparatus shown in FIGS. 3 and 4, the perforated cylinder 14 is secured to the cylindrical wall 19 mounted on the tray 12. The cylindrical wall 19 has a plurality of slots 18 to form entries. In the gas-liquid contacting structure 13, a perforated plate 20 for scattering or breaking liquid with gas is horizontally provided.

Thus the ascending gas-liquid mixing flow is broken into fine pieces, so that contact area of liquid is increased and thereby effective heat and mass transferring is obtained. It should be noted that if corrugated perforated plate is employed as perforated plate 20, more effective result is obtained. Since the slots 18 are opened on the tray, liquid widely expands on the tray after passing through the slots. Further, it should be noted that slot has greater flow rate than that of circular hole, which means that the apparatus is preferably used to treat great quantity of liquid.

In the embodiment shown in FIGS. 5 and 6, the partition plate 17 is provided in the contacting structure 13 along the liquid flow direction and a weir plates 21 are provided on the tray at the outside of the contacting structure at a right angle with the liquid flow direction. The perforated cylinder 14 is made of expanded metal and formed to have downward apertures. The downward apertures guides liquid to flow down so that efficient separation of liquid from gas takes place.

The weir plates 21 prevent the liquid from flowing without entering into the contacting structure to insure the gas-liquid contact. More particularly, liquid firstly enters into the contacting structure 13, flows down on the tray after contacting with gas, overflows the weir plate 21 and enters again into the contacting structure. Thus the liquid contacts with gas at least two times. It should be noted that the weir plate is slightly higher than the hight of the downcomer 16 in order to have the desired effect. In the apparatus ilustrated in FIG. 7, the partition plate 17 in the contacting structure at a right angle with the flow direction of liquid. Other construction is same as that of FIGS. 5 and 6. In accordance with this apparatus, circulation of liquid and hence repeated gas-liquid contact are surely performed.

In the apparatus shown in FIGS. 8 and 9, stays 23 are employed in stead of perforated plate 14. The stays are secured on the cylindrical wall 19 and support the cover 15. The partition plate 17 is secured to the cover 15 and stays 23, the perforated plate 20 is secured to the partition plate.

This apparatus is particularly suited to cause gas to contact with such liquid as corrosive liquid, a high viscosity liquid or including solid particles.

It will be understood that the present invention may provide a novel gas-liquid contacting apparatus having high contacting efficiency because of repeatedly performed gas-liquid contact, and thereby the apparatus is made in small size by decreasing the number of trays.

What is claimed is:

1. In a gas-liquid contacting apparatus comprising an upright column in which the gas flows upwardly, at least one tray mounted transversely in said column and having means for maintaining liquid thereon at a predetermined depth and a gas-flow opening therein, upwardly through which the gas is adapted to flow, contacting structure surrounding said opening comprising a wall projecting upwardly from said tray and having means below said predetermined depth of liquid to permit discharge of the liquid from the tray into said structure, a cylinder mounted on said wall having perforations above said predetermined depth to permit gas to flow outwardly therethrough, and a cover on said perforated cylinder, said structure being designed so that the liquid from said tray within said structure is blown up by the gas ascending through the gas-flow opening of the tray to effect gas-liquid mixture, the improvement wherein vertical partition means is provided to effect repeated gas-liquid contact by said contact structure.

2. A gas-liquid contacting apparatus according to claim 1 wherein the partition is disposed diagonally within perforated cylinder under said cover above said gas-flow opening.

3. A gas-liquid contacting apparatus according to claim 1 including a series of trays mounted transversely in said column in vertically-spaced relation, said means for maintaining the liquid at a predetermined level upon each tray including downcomer means to transfer liquid from an upper tray to the next lower tray and arranged so that the gas does not flow upwardly through said downcomer means, said downcomer means for the next lower tray being positioned at the opposite side of the column from the downcomer means for the upper tray, whereby the liquid is directed to flow across said tray from said upper downcomer means to said next downcomer means, said vertical partition being disposed transversely to said flow direction within said perforated cylinder wall.

* * * * *

UNITED STATES PATENT OFFICE
CERTIFICATE OF CORRECTION

Patent No. 3,779,524    Dated December 18, 1973

Inventor(s) Shogo Tanigawa et al

It is certified that error appears in the above-identified patent and that said Letters Patent are hereby corrected as shown below:

In the heading before [52] U.S. Cl., the following should be added:

[30] Foreign Application Priority Data

August 15, 1970    Japan.........71556/1970
October 3, 1970    Japan.........98732/1970

Signed and sealed this 9th day of July 1974.

(SEAL)
Attest:

McCOY M. GIBSON, JR.
Attesting Officer

C. MARSHALL DANN
Commissioner of Patents